No. 879,086. PATENTED FEB. 11, 1908.
B. M. COFFEE.
VARIABLE SPEED GEARING.
APPLICATION FILED MAR. 7, 1905.
2 SHEETS—SHEET 1.
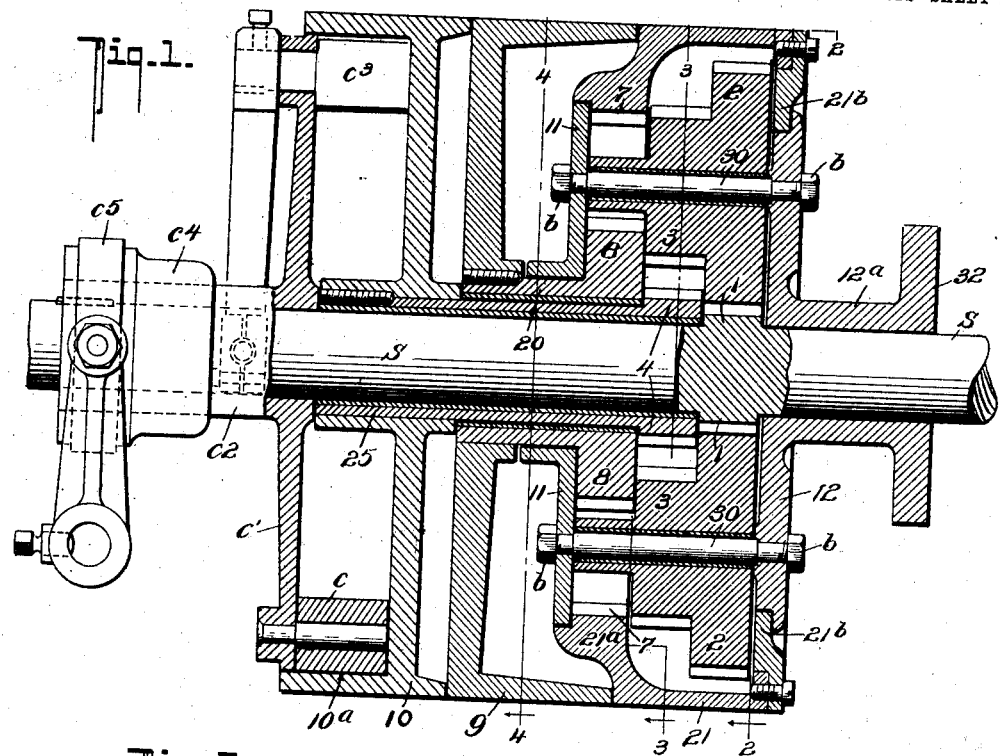
WITNESSES:
F. C. Gibson.
John T. Schrott.
INVENTOR
Bassett M. Coffee.
BY
Fred G. Dieterich & Co.
ATTORNEYS No. 879,086. PATENTED FEB. 11, 1908.
B. M. COFFEE.
VARIABLE SPEED GEARING.
APPLICATION FILED MAR. 7, 1905.

2 SHEETS—SHEET 2.

WITNESSES:
F. C. Gibson
John T. Schrott

INVENTOR
Bassett M. Coffee.
BY
Fred G. Dieterich & Co.
ATTORNEYS

THE NORRIS PETERS CO., WASHINGTON, D. C.

UNITED STATES PATENT OFFICE.

BASSETT M. COFFEE, OF RICHMOND, VIRGINIA, ASSIGNOR OF ONE-FOURTH TO WILLIAM J. WHITEHURST, OF RICHMOND, VIRGINIA.

VARIABLE-SPEED GEARING.

No. 879,086.     Specification of Letters Patent.     Patented Feb. 11, 1908.

Application filed March 7, 1905. Serial No. 248,860.

*To all whom it may concern:*

Be it known that I, BASSETT M. COFFEE, residing at Richmond, in the county of Henrico and State of Virginia, have invented a new and Improved Variable-Speed Gearing, of which the following is a specification.

My present invention relates to improvements in that class of transmission gearing more especially designed for motor vehicles and in which a planetary arrangement of gears is included; and my said invention seeks to provide a compact, easily adjusted and positively operating gear mechanism of the character stated, having the parts correlatively arranged in a peculiar manner whereby high, low, and intermediate forward speeds, and a reverse speed, can be quickly provided for, and transmitted from the driving shaft moving under a constant velocity.

My invention comprehends a new and improved arrangement of drums loosely mounted on the shaft, a train of gears, including one fixedly connected to the drive shaft, two others loosely mounted on the said shaft, a single annular rack that forms a part of one of the drums, supporting members or heads loosely mounted indirectly on the shaft, and a set of gears rotatably mounted on cross shafts that connect at their ends with the supporting heads, and which mesh with each other and create a train of gears that join the gear fixedly held on the drum shaft with the annular rack that forms a part of one of the drums, all being combined and coöperatively connected in the manner hereinafter described, specifically pointed out in the claims, and illustrated in the accompanying drawings, in which:—

Figure 3:
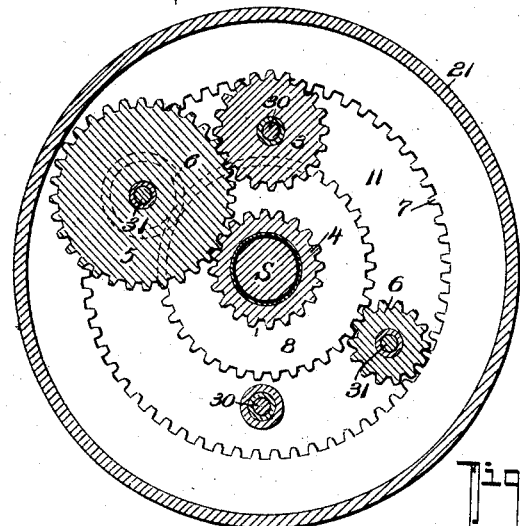
Figure 4:
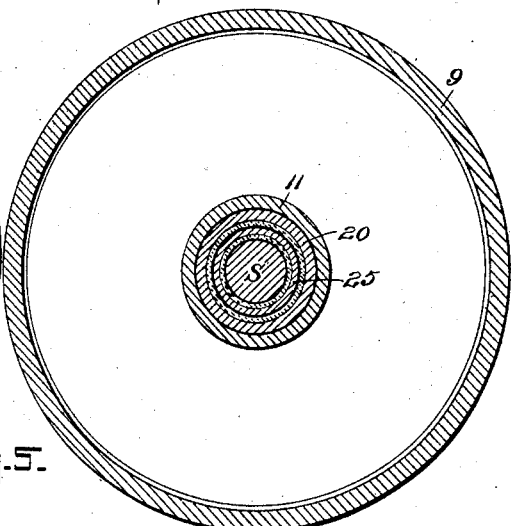
Figure 5:
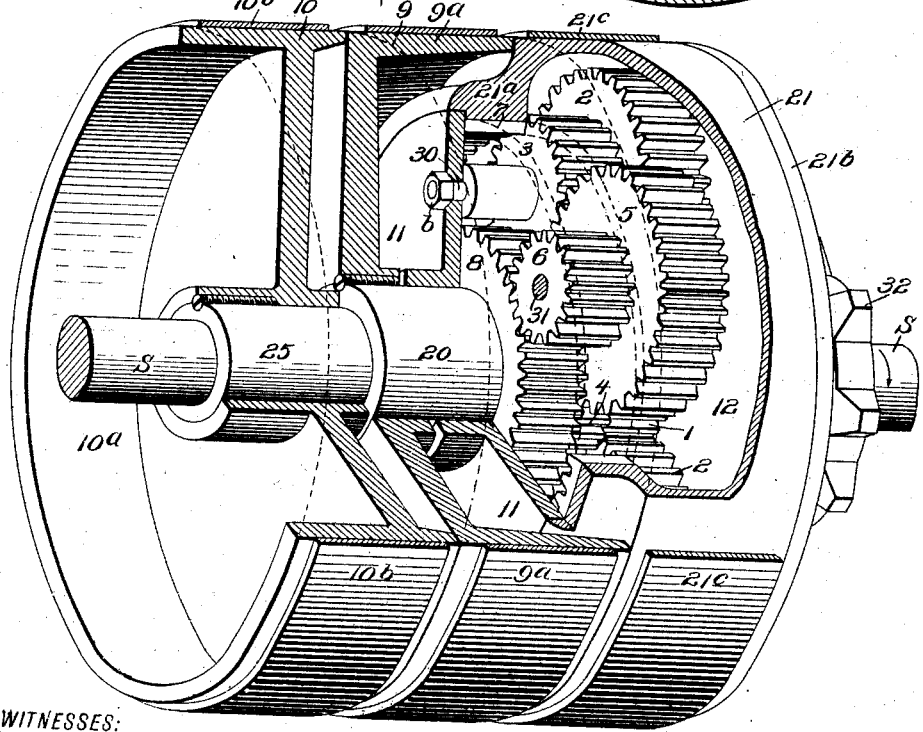

Figure 1, is a vertical longitudinal section of my improved variable speed gearing, Fig. 2, is a transverse section thereof on the line 2—2 of Fig. 1, Fig. 3, is a similar view on the line 3—3 on Fig. 1, Fig. 4, is a cross section on the line 4—4 of Fig. 1, Fig. 5, is a diagrammatic view in perspective which illustrates the correlative arrangement of the several parts that constitute my complete improvement.

In my present form of speed gearing, the drum shaft $s$ has a pinion 1, fixedly connected thereto, located between a pair of end supports or heads 11 and 12, one of which 12 is loosely mounted on the shaft $s$ and has a hub 12ª that has formed integrally therewith or otherwise fixedly joined thereto the sprocket wheel 32.

Adjacent the pinion 1 is another pinion 4 loosely mounted on the shaft $s$ and formed with a long sleeve 25 that extends beyond the head 11 and carries at its outer end the drum 10 hereinafter termed the intermediate speed drum, the same being fixedly connected to the sleeve 25 to turn with it and the pinion 4. The head 11 is loosely mounted upon a sleeve 20 which in turn is loosely mounted on the sleeve 25, and the said sleeve 20 has an integral gear 8, that meshes with the planetary gear 6 mounted on the cross shaft 31 mounted in the head or supporting members 11 and 12.

The gear 6 has an integral gear portion 5 of greater diameter than itself, which is arranged to mesh with the pinion 4 and with another planet gear or pinion 3, loosely mounted on the cross shaft 30 the ends of which take through the heads 11 and 12 and are secured by the nuts $b$—$b$. The gear 3 is formed as an integral part of another gear 2 of greater diameter than said gear 3, that meshes with and is driven by the pinion 1 fixedly mounted on the shaft $s$.

21 designates a drum hereinafter termed the reverse drum, which has a pendent portion 21ª that loosely rides upon the periphery of the head 11, and an annular 21ᵇ that loosely rides on the head 12 as clearly shown in Fig. 1 by reference to which it will be also noticed the drum 21 has an internal rack 7 at that edge adjacent the head 2 with which the gear 6 meshes.

9 designates the slow speed drum, located between the drums 10 and 21 and it is fixedly mounted to turn with the drum 20 and gear 8.

The drum 10 is also utilized for effecting the high speed forward movement, and for such purpose its internal face forms a clutch rim 10ª arranged to coact with a clutch mechanism of suitable construction which, under normal conditions, is held out of a tight frictional contact with the clutch flange of the drum 10 to permit the said drum rotating freely with respect to the drum shaft and which, when shifted to its operative position locks the drum to rotate with the shaft $s$, thus causing the entire mechanism to revolve as a whole with the shaft, and thus provide for obtaining the maximum high forward speed of the said shaft.

The clutch mechanism shown includes a friction ring $c$ secured to a disk $c'$ having a hub $c^2$ keyed to the shaft $s$. The ring $c$ is controlled by an expanding member $c^3$ pivotally mounted on the outer face of the disk $c'$ and controlled in its movement to adjust the friction ring to its clutching position by the sliding collar $c^4$ mounted on the hub $c^2$ and having a yoke $c^5$ for connecting with a shifting rod or lever. The collar has its inner face beveled or rounded to readily move under the head of the member $c^3$ to rock the said member to a clutching position.

While I have shown and described a special form of clutch mechanism it will be understood that other means for locking the drum 10 to the shaft to revolve therewith may be employed.

From the foregoing taken in connection with the drawings, the general operation and the construction of my improved construction of transmission gearing, it is believed, will be readily apparent to those skilled in the art to which my invention relates.

The manner in which the high speed is attained having been explained, the slow speed is effected in the following manner:—The drum is held from rotation by applying the brake band $9^a$,—shaft $s$ and pinion 1 revolving in the direction indicated by the arrow on Fig. 4 the pinion 1 drives the gears 2 and 3, they moving together, gear 3 drives the members 5 and 6, they being integral and moving together. Gear 6 meshes with the gear 8 and since the latter is held stationary by the band $9^a$ on the drum 9, the pinion or gear 6 travels around the gear 8, carries the heads 11 and 12 with the shafts 30 and 31 together with the sprocket wheel 32, forward in the same direction of shaft $s$, but at much slower movement than the said shaft.

To adjust the mechanism for effecting an intermediate speed, the drum 10 is held from turning by the brake band $10^a$, and as shaft $s$ revolves forwardly with pinion 1, the latter drives the double gear 2—3, the member 3 of which transmits motion to gear 5 which meshes with pinion 4, and since the latter is now held stationary by the now immovable drum 10, the said pinion 5 is caused to travel around pinion 4, carrying the heads 11 and 12, the shafts 30 and 31, and the flange or sprocket wheel 32, at an intermediate speed forward. To obtain the reverse movement, the drum 21 is held from rotation by the band $21^a$ and during this adjustment of the drum 21 the shaft $s$ through pinion 1, drives double gear 2—3, gear 3 drives double gear 5 and 6, the member 6 of which meshes with internal rack 7 on drum 21, and since the said drum and rack 7 are held stationary, the gear 6 travels around the inside of drum rack in the direction reverse to the movement of shaft $s$, which carries the heads 11 and 12 with the shafts 30 and 31 and sprocket 3 in the same direction, reverse to the direction of shaft $s$.

Having thus described my invention, what I claim and desire to secure by Letters Patent, is:—

1. In a variable speed gear, a driving shaft; a driving pinion fast thereon, a pair of pinions loosely mounted on the shaft for independent movement, a brake drum having an internal rack, a brake shoe for the drum, independent sets of planetary gears that connect the brake drum with both of the loosely mounted pinions and means for locking either of the said loose pinions from revolving, and other planetary gears connecting the first mentioned sets of planetary gears with the driving pinion.

2. In a variable speed gear, a driving shaft, a driving pinion fast thereon, a pinion loosely mounted on the shaft, another loose pinion directly mounted on the other loose pinion, each of said pinions having a brake drum and brake coöperatively combined therewith, a drum freely rotatable on the shaft having an internal rack, a brake for the said drum, and independent sets of planetary gears that join both of the loosely mounted pinions with the said drum rack and other planetary gears that join the last named sets of planetary gears with the driving pinion, as set forth.

3. A variable speed gearing, comprising in combination; a driving shaft, a driving pinion fixedly held thereon, a pinion loosely held on the shaft, another pinion loosely mounted on the loose pinion, a brake mechanism for each of said loose pinions, independent sets of planetary gears that connect the driving pinion with the loose pinions, a support for the said gears rotatably mounted on the shaft whereby to revolve the said gears about the driving shaft, a drive sprocket fixedly attached to said revolving support, a drum having an internal rack held in mesh with the planetary gears, and a brake for the said drum, all being arranged substantially as shown and described.

4. In a variable speed gear of the character stated, the combination of the driving shaft $s$, the pinion fast thereon, the pinion 4 with the sleeve loosely mounted on the shaft, the gear 8 loosely mounted on the sleeve of pinion 4, the head member 12, a fixedly attached sprocket wheel thereon and loosely mounted on the shaft $s$, the opposite head 11 loosely connected with gear 8 to move independently thereof, the drum 21 rotatably mounted on the heads 11 and 12 and having an internal gear 7, the drum 10 fixedly connected to the sleeve of pinion 4 to turn therewith, the train of planetary gears mounted, shafts for the planetary gears supported in the heads 11 and 12, said gears connecting the fast pinion 1 with the loose pinions or gears 4 and 8 and with the rack 7, and means for locking the rack drum and the loose pinions or gears 4 and 8 from rotation, as set forth.

5. The combination with the driving shaft s, the pinion 1 fast thereon, the supporting head 12 afixedly held sprocket wheel, loosely mounted on the shaft s, the pinion 4 having a sleeve loosely mounted on the shaft s, the gear 8 having a hub loosely mounted on the sleeve of the pinion 4, the drum 10 fixedly connected to the sleeve of pinion 4, the drum 9 fixedly connected to the sleeve in the gear 8, the head member 11 loosely connected to the gear 8, the shafts 30 and 31 mounted in the heads 11 and 12, the double gear 2—3 on shaft 30, one member 2 of which meshes with the pinion 1, the double gear 5—6, one member 5 of which, meshes with pinion 4, the other 6 of which meshes with gear 8, the drum 21 loosely mounted on the heads 11 and 12, said drum having an internal annular rack that meshes with the gear portion 6, and means for holding each of the drums 10—9 and 21 from movement, for the purposes specified.

BASSETT M. COFFEE.

Witnesses:
R. A. COFFEE,
ROBT. E. VAUGHAN.